United States Patent
Landler

(10) Patent No.: US 10,766,146 B2
(45) Date of Patent: Sep. 8, 2020

(54) ACTIVE CLAMPING DEVICE

(71) Applicant: KRONES AG, Neutraubling (DE)

(72) Inventor: Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/213,972

(22) Filed: Dec. 7, 2018

(65) Prior Publication Data
US 2019/0176343 A1 Jun. 13, 2019

(30) Foreign Application Priority Data
Dec. 11, 2017 (DE) .......................... 10 2017 129 506

(51) Int. Cl.
| | | |
|---|---|---|
| B25J 15/08 | (2006.01) | |
| B25J 15/12 | (2006.01) | |
| B25J 15/00 | (2006.01) | |
| B25J 15/02 | (2006.01) | |
| B25J 9/00 | (2006.01) | |
| B65G 47/86 | (2006.01) | |
| B67C 3/24 | (2006.01) | |
| B65G 47/90 | (2006.01) | |

(52) U.S. Cl.
CPC ......... B25J 15/0028 (2013.01); B25J 9/0015 (2013.01); B25J 15/0226 (2013.01); B65G 47/847 (2013.01); B65G 47/90 (2013.01); B67C 3/242 (2013.01); B65G 2201/0247 (2013.01)

(58) Field of Classification Search
CPC ........ B25J 15/08; B25J 15/12; B25J 15/0226; B25J 9/0015; B65G 47/848

USPC ...................... 294/99.1, 116, 203; 198/803.3
See application file for complete search history.

(56) References Cited

U.S. PATENT DOCUMENTS

| | | | | |
|---|---|---|---|---|
| 4,093,296 A | * | 6/1978 | Itoh ........................ | B65G 47/90 294/115 |
| 4,169,621 A | * | 10/1979 | McGill ................... | B65B 21/12 294/116 |
| 5,743,377 A | * | 4/1998 | Kronseder ........... | B65G 47/847 198/470.1 |

(Continued)

FOREIGN PATENT DOCUMENTS

| | | |
|---|---|---|
| DE | 102005014838 | 10/2006 |
| DE | 102012218204 | 4/2014 |

(Continued)

OTHER PUBLICATIONS

Extended European Search Report from European Patent Application No. EP 18211558.4, dated Oct. 10, 2019 (12 pages).

(Continued)

Primary Examiner — Douglas A Hess
(74) Attorney, Agent, or Firm — Haynes and Boone, LLP

(57) ABSTRACT

An active clamping device for holding a container in a container treatment device, for example for holding a beverage container by a neck section, includes two clamping arms and a pre-tensioning element. Each clamping arm has a holding section for holding the container that is to be held, and a control section for interacting with a control cam to actively displace each holding section. The pre-tensioning element pre-tensions the holding sections in a predetermined position. The clamping arms and the pre-tensioning element are formed as a single piece. A clamping arm and a container treatment device are also provided.

20 Claims, 10 Drawing Sheets

(56) References Cited

U.S. PATENT DOCUMENTS

| | | | | |
|---|---|---|---|---|
| 7,431,364 B2 * | 10/2008 | Huang | | B25J 7/00 294/100 |
| 8,128,142 B2 * | 3/2012 | Glotzl | | B65G 47/847 198/803.9 |
| 8,167,607 B2 * | 5/2012 | Linke | | B29C 49/4205 198/470.1 |
| 8,206,144 B2 * | 6/2012 | Ng | | B29C 49/4205 198/803.4 |
| 8,297,671 B2 * | 10/2012 | Knieling | | B67C 3/242 294/90 |
| 8,465,070 B2 * | 6/2013 | Knieling | | B65G 47/847 294/90 |
| 8,602,471 B2 * | 12/2013 | Bodtlander | | B67C 3/242 294/192 |
| 8,833,824 B2 * | 9/2014 | Fahldieck | | B65G 47/847 294/90 |
| 8,894,114 B2 * | 11/2014 | Fahldieck | | B67C 3/242 294/90 |
| 8,899,646 B2 * | 12/2014 | Wilson | | B25J 15/0028 294/116 |
| 9,102,479 B2 * | 8/2015 | Schulnig | | B29C 45/0053 |
| 10,059,008 B2 * | 8/2018 | Staab | | B25J 15/00 |
| 2014/0175819 A1 | 6/2014 | Wilson et al. | | |

FOREIGN PATENT DOCUMENTS

| | | |
|---|---|---|
| EP | 0939044 | 9/1999 |
| EP | 2138434 | 12/2009 |
| EP | 2143674 | 1/2010 |
| EP | 2653436 | 10/2013 |
| EP | 2716593 | 4/2014 |
| EP | 3181496 | 6/2017 |
| WO | WO 2016/169717 | 10/2016 |

OTHER PUBLICATIONS

Search Report from German Patent Application No. DE 10 2017 129 506.2 dated Jul. 16, 2018 (8 pages).

Search Report from European Patent Application No. EP 18211558.4, dated Jun. 3, 2019 (13 pages).

* cited by examiner

ACTIVE CLAMPING DEVICE

CROSS-REFERENCE TO RELATED APPLICATIONS

This application claims priority from German Patent Application No. DE 10 2017 129 506.2, filed on Dec. 11, 2017 in the German Patent and Trademark Office, the disclosure of which is incorporated herein by reference in its entirety.

BACKGROUND

Technical Field

The present invention relates to an active clamping device for holding a container in a container treatment device, and to a container treatment device.

Related Art

In beverage filling plants, it is known to use clamping devices to transport each of the containers that are to be filled and/or the containers that have already been filled through the individual treatment stations of the container treatment device. For this purpose, various clamping devices are known. These differ in the ways in which they hold the containers to be treated.

Passive clamping devices are for example known, which are elastically pre-tensioned only by the insertion of the container into the clamping device. They then hold the container. Such a clamp for gripping containers is known from DE 10 2012 218 204 A1. This clamp has a fixed position. In order for it to grip a container, it is necessary to push the container into the clamp. The stiff gripping arms are thereby spread apart, which means that the container must be displaced against the closing force of the gripping arms that arises from the spreading of the clamp. This exerts a large force on the containers as they are inserted, and such holding devices are therefore unsuitable for gripping or holding fragile and/or easily deformable or thin-walled containers. At the least, there is a tendency for the surfaces of the applicable containers to be scratched, thus lowering the quality of the containers.

Active clamping devices are also known, in which the holding sections of the clamping device are actively opened and closed by means of an actuator. Such active clamping devices serve in particular to enable the safe and gentle reception of the containers from a previous clamping device, or to ensure that the handover of the containers to a subsequent clamping device is equally safe and the containers are handled gently. In particular, the active opening and closing of each clamping device makes it possible to avoid increased friction on the applicable container, which could lead for example to scratches on the container. In addition, it is possible to set a predetermined holding force or clamping force, which can be kept within a specified tolerance range for the dimensions of the container. Such active clamping devices comprise a large number of individual components, for example clamping arms, bushings, spring elements, pre-tensioning elements and corresponding connecting elements for the secure connection of the above-mentioned components. Clamping devices that are designed in this way are consequently complex to clean and have a correspondingly high production cost.

From EP 0 939 044 A1, a bottle gripper is known, in which a gripping device is provided. This has two gripping arms, which can be brought by means of a control cam into a holding position or a release position. The control cam engages with a contact face formed on each gripping arm, and the contact surface is formed as part of an elastic pad, one of which is disposed on each gripping arm.

From EP 2 143 674 A, an active clamping device for holding containers is known, in which two gripping arms or clamping arms with separate arrangements of magnets are held in an open position. The clamping arms have rearwards-facing closing levers, which cooperate with a closing cam disposed between them in order to bring the clamping arms from the open position to a closed position.

DE 10 2005 014 838 A1 shows an active clamping device for holding vessels, which has two clamping arms that can be displaced relative to each other for opening and closing. In order to enable secure holding of the vessels, one gripping arm of the clamp is shape-stable and the other gripping arm is shape-elastic. The gripping arms are pre-tensioned in an open position by means of magnets arranged upon them, and are pivoted into the closed position by means of a control cam.

SUMMARY

An active clamping device for holding a container in a container treatment device, for example for holding a beverage container by a neck section, is described.

Accordingly, an active clamping device for holding a container in a container treatment device, for example for holding a beverage container by a neck section, is provided, wherein the active clamping device includes two clamping arms, each of which has a holding section for holding the container that is to be held, and each of which has a control section for interacting with a control cam to actively displace each holding section, and further includes a pre-tensioning element for pre-tensioning the holding sections in a predetermined position. The clamping arms and the pre-tensioning element are formed as a single piece.

The clamping arms are thereby connected to each other via the pre-tensioning element, and the clamping arms and the pre-tensioning element are formed as a single piece.

Due to the fact that the clamping arms are connected to each other via the pre-tensioning element, and the clamping arms and the pre-tensioning element are formed as a single piece, an active clamping device with a particularly simple design can be provided.

Due to the single-piece design, the number of components is significantly reduced by comparison with conventional active clamping devices. It is no longer necessary, as previously done, to provide a multiplicity of individual parts, for example individual clamping arms, separate pre-tensioning elements and the connecting elements needed to connect the above-mentioned parts, which involves elaborate assembly and, due to the many gaps and crevices between the individual parts, necessitates high cleaning expenses. Instead, a single part is provided.

In consequence, the expense of assembly is also dispensed with, and in addition parts that are formed as a single piece are particularly simple to clean, and hence the active clamping device is particularly suitable for use in plants with exacting hygiene requirements. Furthermore, an active clamping device as described is particularly simple to mount on a container treatment device, since there is no need to ensure that a multiplicity of individual components is correctly aligned with each other.

In several embodiments, the pre-tensioning element pre-tensions the clamping arms in an open position of the holding sections, wherein the control sections are designed for interaction with the control cam to actively displace the holding sections to a closed position.

By this means it is achieved that the clamping arms are constantly held in the open position, and the clamping arms only pivot to adopt the closed position of the holding sections when the control sections are actively displaced by means of the control cam, for example by means of a displacement of the control sections from their initial position, which is achieved by a rotation of the control cam. If the control cam rotates back, the clamping arms are moved back to the open position, and held in this position, due to the tension in the pre-tensioning element. The clamping device thus has a constant open position when at rest, and closes only when the control sections are actively actuated. As a result, the clamping device only grips when it is actively actuated to do so. The displacement of the clamping arms by the control cam also enables the containers to be held in a particularly secure manner.

In certain embodiments, the pre-tensioning element pre-tensions the clamping arms in a closed position of the holding sections, wherein the control sections are designed for interaction with the control cam to actively displace the holding sections to an open position.

By this means it is achieved that the clamping arms are constantly pre-tensioned in the closed position, and the clamping arms only pivot to adopt the open position of the holding sections when the control sections are actively displaced by means of the control cam, for example by means of a displacement of the control sections from their initial position, which is achieved by a rotation of the control cam. If the control cam rotates back, the clamping arms are moved back to the closed position, and held in this position, due to the pre-tension in the pre-tensioning element.

The clamping device thus has a constant closed position when at rest, and opens only when the control sections are actively actuated. Thus the clamping device is pre-tensioned to grip the container. In a majority of the movement area of container treatment plants, containers to be treated are usually held on clamping devices mounted thereon. Accordingly, it is possible to dispense with additional elements which would otherwise be needed to hold the clamping devices in the closed position. Thus control cams, which are necessary for the active opening of the clamping devices, can be provided only in the areas in which the holding sections must be in the open position, for example for reception or handover of a container.

In order to provide a particularly advantageous design of the clamping device, each of the clamping arms can be pivotable about a pivot axis. Due to the pivoting about the defined pivot axes, the open position and the closed position can be adopted particularly accurately.

In several embodiments, the control sections are formed on the clamping arms, in each case in the form of a lever arm, so that interaction with the control cam can take place in a particularly simple manner.

By means of a displacement of the lever arms, a pivoting of the clamping arms about the pivot axes takes place, so that the control cam can have a pivot point whose position is fixed relative to the clamping arms, and the control cam only needs to be rotated.

In some embodiments, the pre-tensioning element is designed as a bow spring, wherein the pre-tensioning element is generally designed in the form of a bowed element extending from one clamping arm to the other clamping arm.

A pre-tensioning element with such a design has a shape that is easy to clean, and which can also be manufactured in a simple manner. In addition, a pre-tensioning force with which the clamping arms are pre-tensioned can be specified particularly accurately, and/or adjusted to the individual application, throughout the length of the bow spring or bowed element and throughout its cross-section.

In certain embodiments, the control sections and the pre-tensioning element are disposed on a side of the clamping arms which is opposite to the holding sections, so that in the region of the holding area there are no components that interfere with the holding of the container. In addition, by this means the probability is reduced that a treatment medium, for example a filling product with which the container is to be filled or has been filled, comes into contact with the control sections and the pre-tensioning element.

The holding sections are generally disposed in each case on one side of the clamping arms, relative to the pivot axes, and the control sections and/or the pre-tensioning element are disposed in each case on the other side.

In order to design the active clamping device in a manner that makes it particularly suitable for use in applications with increased or exacting hygiene requirements, for example aseptic applications, at least the clamping arms can have, on their upper side, inclined surfaces for conducting away fluids.

By this means it is achieved that particles and/or fluids which impinge upon the inclined surfaces slide off of the inclined surface due to the effect of gravity, and the formation of persistent contamination, such as for example a microbiological film, is reduced or wholly prevented.

The inclined surfaces are typically designed such that they are at an angle of at least 3° to a plane oriented perpendicular to the pivot axes, and/or, relative to an installation position of the clamping device on a container treatment device, are at an angle of at least 3° to a plane oriented perpendicular to the direction of the acceleration due to gravity.

The inclined surfaces are further generally oriented such that they enable particles to slide off in an outwards direction, i.e. away from a center or central plane of the clamping device. In other words, at least the clamping arms each slope in an outwards direction.

In various embodiments, the clamping arms have support elements, spaced apart from each other, for supporting the position of the clamping arms with respect to an installation position in the clamping device, for example with respect to the pivot axes, against tilting, wherein generally in each case one support element is formed in the region of, or around, each pivot axis, and/or one support element is spaced apart from each pivot axis, for example at an end of the control area, particularly at a free end of the control section which is designed as a lever arm, and/or on the pre-tensioning element.

The support elements in certain embodiments act together with corresponding support areas or support surfaces on the container treatment device, upon which they support themselves and thereby the clamping device against tilting relative to the pivot axes. Free play occurring in a bearing of the clamping device at the pivot axes can by this means be substantially or wholly prevented.

In several embodiments, the control sections are designed to be elastic, wherein generally on each lever arm that forms the control section an elastic element is formed, for example in a single piece, and/or the control sections are designed to be shape-elastic, wherein typically the lever arm has a length and cross-section such that the lever arm is generally elastically deformable at least within a defined area.

By this means the control section can thus respond to the force applied by the control cam and, by means of gentle application of this force via the clamping arms to the holding section, due to the pre-tension, can enable the container to be gently and reliably held. It is furthermore possible on the one hand to achieve a gentle operation of the clamping device by means of the control cam, and on the other hand to compensate for tolerances in the size of the containers by means of the elastic deformability of the control sections that is thereby achieved, so that it is thereby possible safely to hold containers within a certain tolerance range. Within certain limits, this also enables containers which are incorrectly gripped to be held safely.

If the clamping arms, generally together with the holding sections and control sections, and the pre-tensioning element are formed as a single piece as a 3D printed part or injection molded part, it is possible to achieve simple and cost-effective manufacturing and at the same time a high degree of freedom of form. Thus the shape of the clamping arms and the pre-tensioning element can be designed in a single piece, and despite this can be adapted specifically to the requirements of the particular application.

In several embodiments, the clamping arms, generally together with the holding sections and control sections, and the pre-tensioning element, are formed as a single piece from a plastic, particularly from an engineering plastic or a high-performance plastic, for example from polyether ether ketone (PEEK).

Due to the good workability of plastics, simple manufacture is achieved. In addition, the active clamping device can have the required mechanical properties. For example, by means of the choice of the plastic, for example polyamide (PA), in particular PA6 or PA 66, or PEEK, it is possible to provide a high degree of long-term resistance to mechanical failure and a sufficient degree of pre-tension.

It is furthermore possible to dispense with the bearing bushes that are usually used as bearings for metal clamping arms and are necessary in the case of conventional clamping devices. This is possible because a bearing bore with the required tolerances and anti-friction properties can be incorporated in a simple manner in the clamping arms themselves due to the properties, in particular the anti-friction properties, of the selected plastic, in particular in the case of PEEK.

Thus due to the single piece design of the clamping arms and the pre-tensioning element using plastic, it is possible to provide an exchangeable part which is simple to manufacture and easy to install and de-install. Worn or old parts can be granulated, and the reclaimed material can be reused for the manufacture of new parts, thus reducing the material usage. In addition, due to the use of plastic in the clamping arms and the pre-tensioning element, an active clamping device that is designed in this manner has a low weight, particularly in comparison with conventional clamping devices with metal clamping arms and/or metal pre-tensioning elements.

A clamping arm for holding a container in a clamping device is also described.

Accordingly, a clamping arm for holding a container in a clamping device is provided, including a holding section for holding the container that is to be held and a control section for interaction with a control cam to actively displace the holding section. The clamping arm has at least two support elements, spaced apart from each other, for supporting the position of the clamping arm with respect to a pivot axis of the clamping arm against tilting with respect to an installation position in the clamping device.

The support elements generally act together with corresponding support areas or support surfaces of a container treatment device, upon which they support themselves and thereby the clamping arm, or support a clamping device including the clamping arm, against tilting relative to the pivot axes. Free play occurring in a bearing of the clamping arm at the pivot axis can by this means be substantially or wholly prevented.

Due to the fact that the clamping arm has at least two support elements, spaced apart from each other, for supporting the position of the clamping arm with respect to a pivot axis of the clamping arm against tilting with respect to an installation position in the clamping device, an active clamping device with a particularly simple design can be provided.

Because the clamping device itself has the at least two support elements, which are spaced apart from each other, the number of parts can be reduced in comparison with conventional clamping devices. It is thereby possible to dispense with the previously required units or devices for supporting the clamping arms in the clamping device and/or for supporting the container that is held in the clamping device. Because of this, assembly of a clamping device and/or container treatment device that includes the clamping arms is less elaborate, and due to the reduction in the number of gaps and crevices between the individual parts, the expense of cleaning such a clamping device and/or container treatment device is reduced.

In addition, a clamping arm as described herein can be particularly simply mounted on a clamping device and/or container treatment device, since there is no need to ensure that the clamping arm and a separate support device are correctly aligned with each other. In some embodiments, in each case one support element is formed in the region of the pivot axis and one support element is spaced apart from the pivot axis, generally at an end of the control area, for example at a free end of a control section which is designed as a lever arm. By this means an effective bearing for the clamping arm and particularly effective protection against tilting are provided.

As the distance between the support element in the region of the pivot axis and the support element that is spaced apart from it increases, the possible free play in the bearing of the clamping arm is progressively reduced. As the distance, i.e. the spacing between the two support elements, increases, displacement in the direction of the pivot axis of the support element that is spaced apart from the pivot axis results in a correspondingly smaller tilting angle.

The control section is generally designed to be elastic, wherein typically an elastic element is formed on a lever arm that forms the control section, and/or or the control section is designed to be shape-elastic, wherein usually the lever arm has a length and cross-section such that the lever arm is generally elastically deformable at least within a defined area. By this means the control section can thus respond to the force applied by the control cam and, by means of gentle application of this force to the holding section, due to the pre-tension, can enable the container to be gently and reliably held. It is furthermore possible on the one hand to achieve a gentle operation of the clamping device by means of the control cam, and on the other hand to compensate for tolerances in the size of the containers by means of the elastic deformability of the control sections that is thereby achieved, so that it is accordingly possible safely to hold containers within a certain tolerance range. Within certain limits, this also enables containers which are incorrectly gripped to be held safely.

If the clamping arm and at least one support element are designed as a single piece, it is possible to achieve simple and cost-effective manufacturing and at the same time a high degree of freedom of form.

In several embodiments, the clamping arm and at least one support element are designed as a 3D printed part or injection molded part, generally formed from a plastic, for example from an engineering plastic or a high-performance plastic, such as from PEEK.

Due to the good workability of plastics, simple manufacture is achieved. In addition, the clamping arm can have the required mechanical properties. For example, by means of the choice of the plastic, for example PA, in particular PA6 or PA 66, or PEEK, it is possible to provide a high degree of long-term resistance to mechanical failure and a sufficient degree of pre-tension.

It is furthermore possible to dispense with the bearing bushes that are usually used as bearings for metal clamping arms and are necessary in the case of conventional clamping devices. This is possible because a bearing bore with the required tolerances and anti-friction properties can be incorporated in a simple manner in the clamping arms themselves due to the properties, in particular the anti-friction properties, of the selected plastic, in particular in the case of PEEK.

Thus due to the design of the clamping arm and/or the at least one support element using plastic, it is possible to provide an exchangeable part which is simple to manufacture and easy to install and de-install. Worn or old parts can be granulated, and the reclaimed material can be reused for the manufacture of new parts, thus reducing the material usage. In addition, due to the use of plastic, a clamping arm that is designed in this manner, and/or a support element that is designed in this manner, has a low weight, particularly in comparison with conventional clamping devices with metal clamping arms and separate support devices.

Alternatively, or in addition, according to some embodiments, at least one support element can have a different material from the clamping arm, such as a metal or a metal alloy, and/or at least one support element can be provided as a separate part, for example as a bearing bush. By this means it is possible to provide the support element with the required mechanical characteristics, in particular the required resistance to deformation and resistance to abrasion, while other areas of the clamping arm which are less exposed to stresses can be formed from a different material which is, for example, lighter and/or cheaper.

In some embodiments, the at least one support element with a different material from that of the clamping arm is inserted in the clamping arm and/or injection molded or 3D-printed as an insert.

In order to design the active clamping device in a manner that makes it particularly suitable for use in applications with increased or exacting hygiene requirements, for example for use in aseptic applications, an upper side of the clamping arm can have at least one inclined surface for conducting away fluids.

By this means it is achieved that particles and/or fluids which impinge upon the inclined surface slide off of the inclined surface due to the effect of gravity, and the formation of persistent contamination, such as for example a microbiological film, is reduced or wholly prevented.

The inclined surfaces are generally designed such that they are at an angle of at least 3° to a plane oriented perpendicular to the pivot axes, and/or, relative to an installation position of the clamping device on a container treatment device, are at an angle of at least 3° to a plane oriented perpendicular to the direction of the acceleration due to gravity.

The inclined surfaces are further typically oriented such that they enable particles to slide off in an outwards direction, i.e. away from a center or central plane of a clamping device which has at least one clamping arm. In other words, the clamping arms both slope in an outwards direction.

A container treatment device for treating containers, which has a clamp carrier and, disposed thereon, at least one active clamping device as described herein, and/or a clamping device with at least one clamping arm as described herein, is also provided.

Alternatively, the clamping arms and the pre-tensioning element in the above-mentioned embodiments can also be provided as individual parts.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
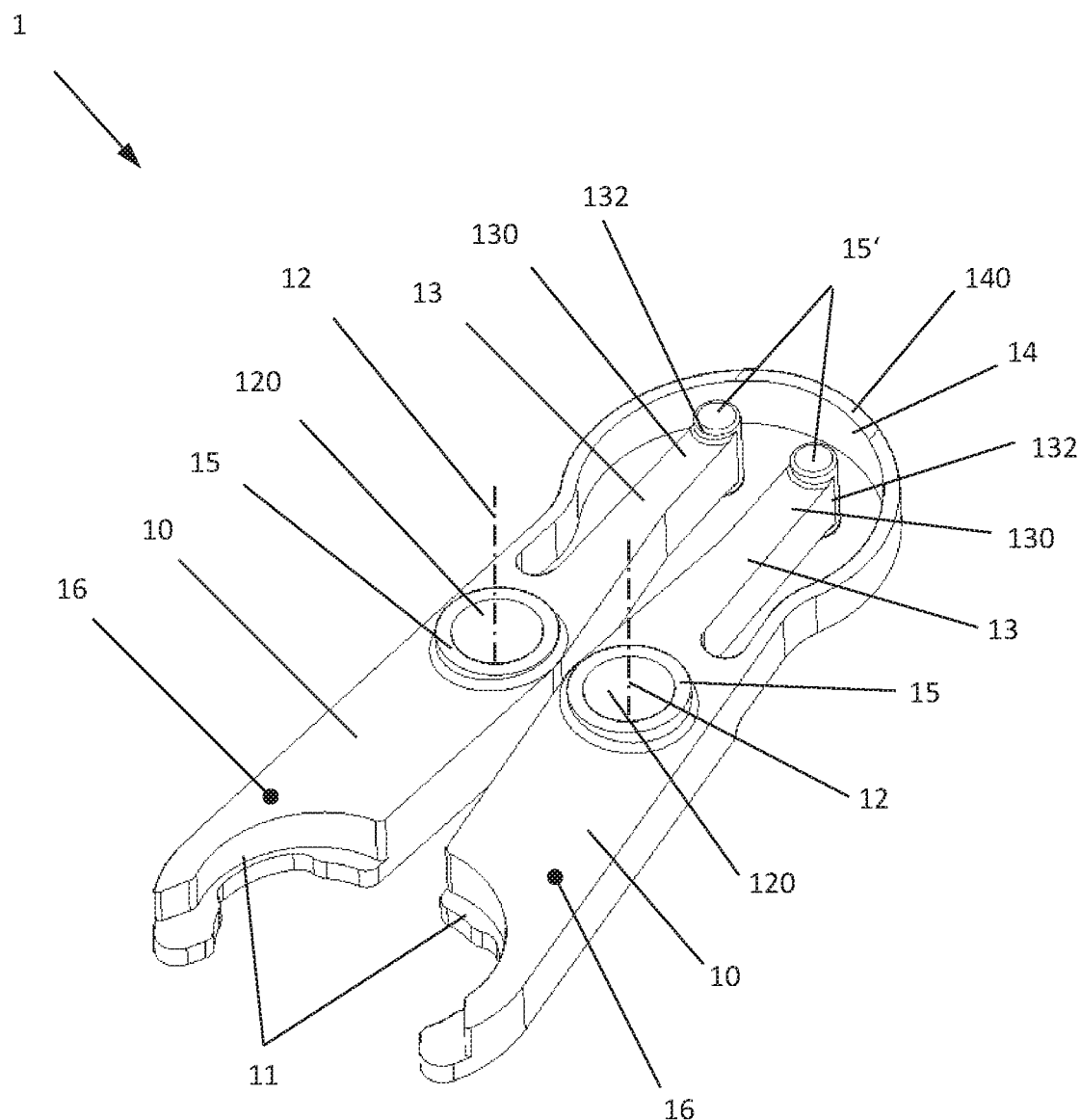
FIG. 1 is a schematic perspective view from above of an active clamping device for holding a container.

FIG. 1 shows schematically a perspective view from above of an active clamping device 1 for holding a container (which is not shown here).

The active clamping device 1 has two clamping arms 10, each of which has a holding section 11 for holding the container which is to be held. The holding section 11 typically grips a neck section of the container which is to be held—for example directly below a support ring. The active clamping device 1 can thus advantageously be provided for the "neck handling" of containers in a container treatment device.

Each clamping arm 10 further has a control section 13 for interacting with a control cam (not shown here) to actively displace the clamping arms 10 and thereby also the holding section 11.

Between the holding section 11 and the control section 13, each clamping arm 10 has a hole 120, through which a pivot axis 12 passes. Accordingly, if the clamping arms 10 are mounted on a container treatment device such that they can pivot, for example by means of bolts passed through each of the holes 120, pivoting about the pivot axis 12 can be achieved.

The control sections 13 of the clamping arms 10 are each designed in the form of a lever arm 130 extending from the area of the pivot axis 12 towards the rear, i.e. on the opposite side of the pivot axis 12 from the holding section 11.

The clamping arms 10 are connected with each other via a pre-tensioning element 14 in the form of a bowed element 140 which extends from one clamping arm 10 to the other clamping arm 10. The clamping arms 10 and the pre-tensioning element 14 are thereby formed together as a single piece. The bowed element 140 extends to the rear from the area of the pivot axes 12, and encompasses the lever arms 130.

The pre-tensioning element 14 pre-tensions the clamping arms 10 in an open position of the holding sections 11. The clamping arms 10 are thus held by the pre-tensioning element 14 in a position relative to each other in which the holding sections 11 adopt the open position, as shown in FIG. 1.

Around each of the holes 120, an annular support element 15 is provided. A further support element 15' is provided at a free end 132 of each lever arm 130. The support elements 15 and 15' serve to stabilize the position of the clamping arms 10 relative to an installation position in the clamping device 1 on the container treatment device, as is described in detail below with reference to FIG. 6.

The clamping arms 10 further have, on their upper side, inclined surfaces 16 for conducting away fluids. By means of these, particles and/or fluids which impinge upon the inclined surfaces 16 slide off of the inclined surfaces 16 due to the effect of gravity. This reduces or even prevents entirely the formation of persistent contamination such as for example a microbiological film. The inclined surfaces 16 extend at least over the region of the active clamping device 1 in which it protrudes into the treatment area of the container treatment device. This is typically the case at least in the region between the holding section 11 and the pivot axis 12. The subsequent FIGS. 4 to 6 show this again.

In various embodiments, the inclined surfaces extend over substantially the entire upper side of the clamping arms 10, and to a large extent also over the pre-tensioning element 14 which is designed as a bowed element 140.

Figure 2:
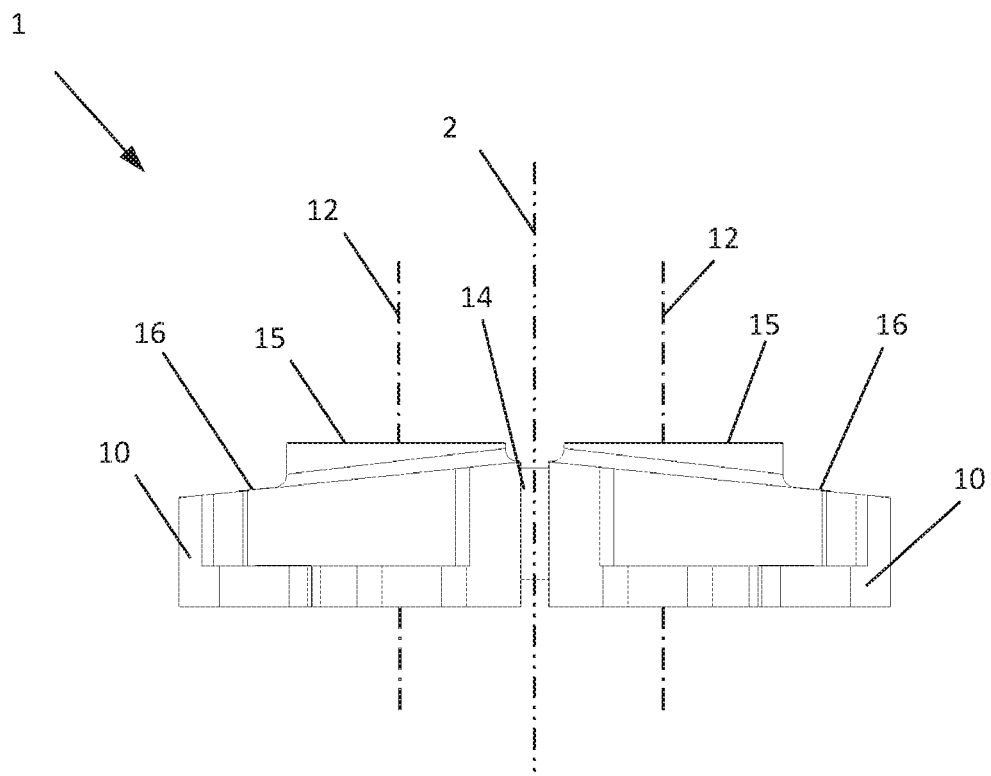
FIG. 2 is a schematic front elevation of the active clamping device 1 from FIG. 1.

FIG. 2 shows schematically a front elevation of the active clamping device 1 from FIG. 1. The inclined surfaces 16 can clearly be seen on the upper side of the clamping arms 10.

The inclined surfaces 16 are oriented such that particles slide off of them in an outwards direction with respect to a median longitudinal plane or central axis, i.e. away from the median longitudinal plane or central axis 2 of the clamping device 1. In other words, at least the upper sides of the clamping arms 10 each slope in an outwards direction. The support elements 15 and 15' do not form part of the sloping area; their upper surfaces extend perpendicular to the pivot axes 12 in order to enable them to contact in a stable manner a fixing area (not shown here) of the container treatment device.

Figure 3:
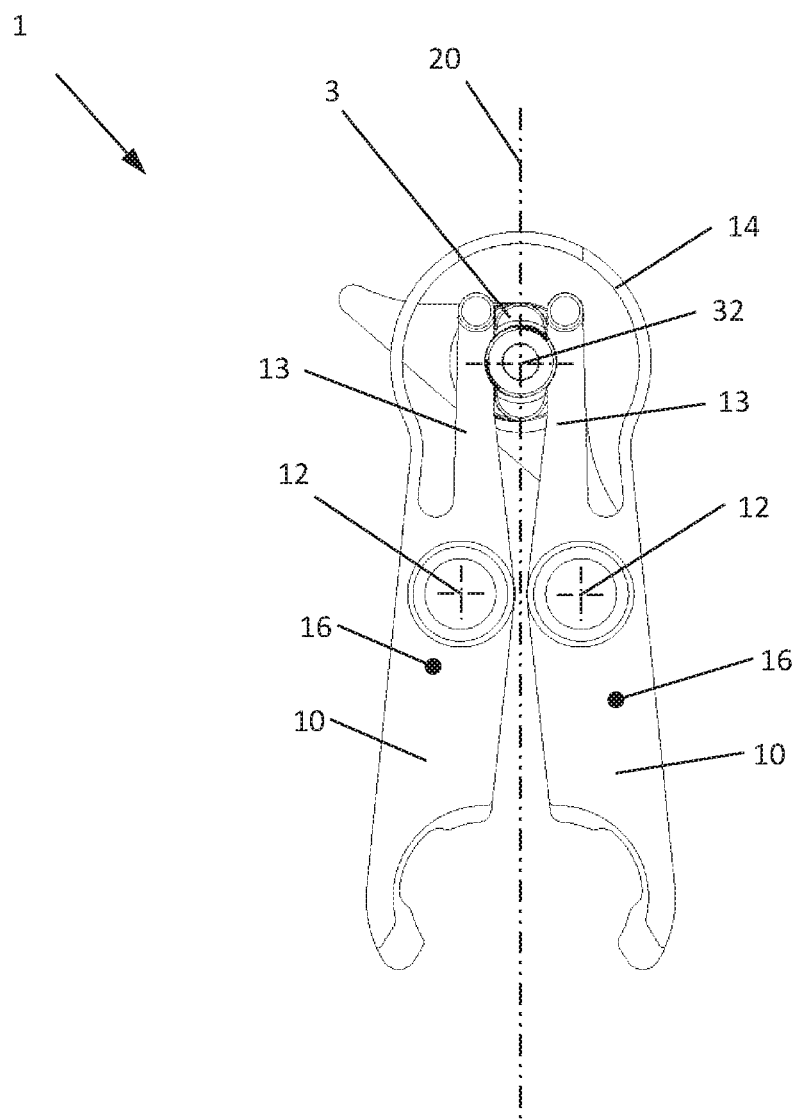
FIG. 3 is a schematic plan view of the active clamping device from FIG. 1 in interaction with a control cam.

FIG. 3 shows schematically a plan view of the active clamping device 1 from FIGS. 1 and 2 in interaction with a control cam 3. In FIG. 3, the longest extension of the control cam 3 extends parallel to the central longitudinal axis 20 of the active clamping device 1. In this state, the pre-tensioning element 14 pre-tensions the clamping arms 10 in the open position of the holding sections 11. If the control cam 3 rotates about its axis of rotation 32, the control cam 3 forces the lever arms 130 outwards from their initial position, so that the clamping arms 10 undergo a pivoting movement about their respective pivot axes 12 and are pivoted against the tension of the pre-tensioning element 14 into the closed position of the holding sections 11. By means of the rotation of the control cam 3, the holding sections 11 are consequently actively displaced to their closing position. Thus by means of the interaction with the control cam 3 a container that is to be held can be actively gripped.

To open the clamping device 1, or to move the holding sections 11 back to their open position, the control cam 3 must be rotated back to the position shown in FIG. 3. Due to the tension created in the pre-tensioning element 14 by the pivoting of the clamping arms 10, the clamping arms 10 are pivoted back into the position shown in FIG. 3, and the holding sections 11 are correspondingly moved back to their open position.

The clamping arms 10, together with their holding sections 11 and control sections 13, along with the pre-tensioning element 14, are formed as a single piece from a plastic, in the present case PEEK. Due to the elasticity of PEEK and the shape of the lever arms 130, i.e. their length and their cross-sectional profile, the control sections 13 are shape-elastic. In other words, based on the elasticity of PEEK the lever arms 130 are designed as elastic bending beams. Because of this the control section 13 can accordingly respond to the force applied by the control cam 3, and thus, by means of the pre-tension, it can apply this force gently via the clamping arms 10 to the holding section 11 to enable a gentle and at the same time reliable holding of the container. In addition, it is possible not only to achieve gentle operation of the clamping device 1 by means of the control cam 3, but also compensate for tolerances in the size of the container by means of the elastic deformability of the control sections 13 that is thereby achieved, so that it is possible to hold containers within a certain tolerance range safely. Within certain limits, this also enables containers which are incorrectly gripped or have been supplied in the incorrect orientation to be handled safely and without damage.

The single-piece part which includes the clamping arms 10, together with the holding sections 11 and control sections 13, along with the pre-tensioning element 14, is produced in this case by means of a 3D printing process. Alternatively, it can be produced for example by means of injection molding.

Figure 4:
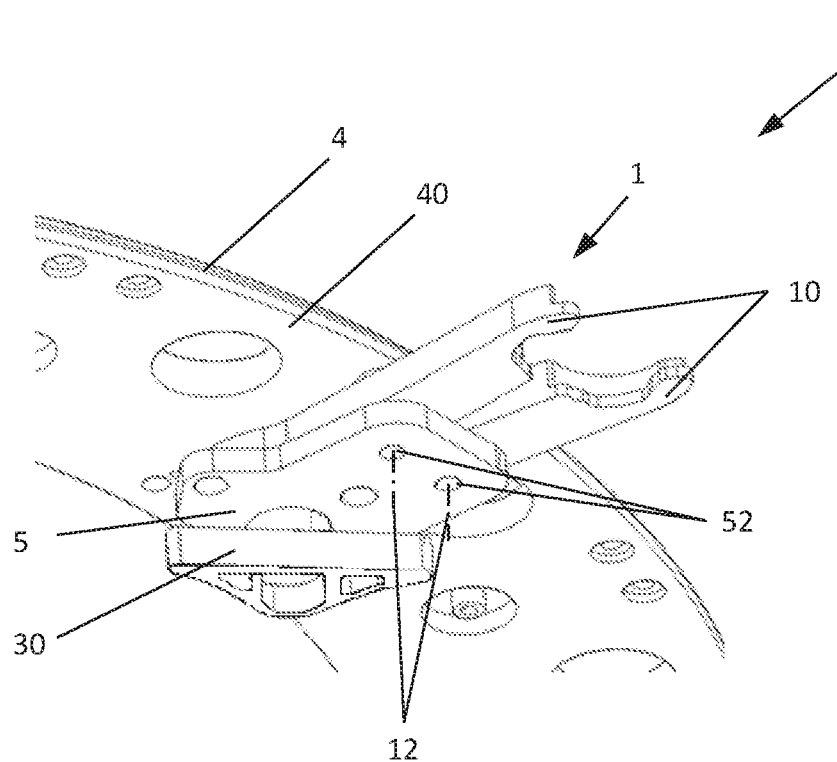
FIG. 4 is a schematic perspective side view from below of a portion of a container treatment device with an active clamping device according to FIG. 1.
Figure 5:
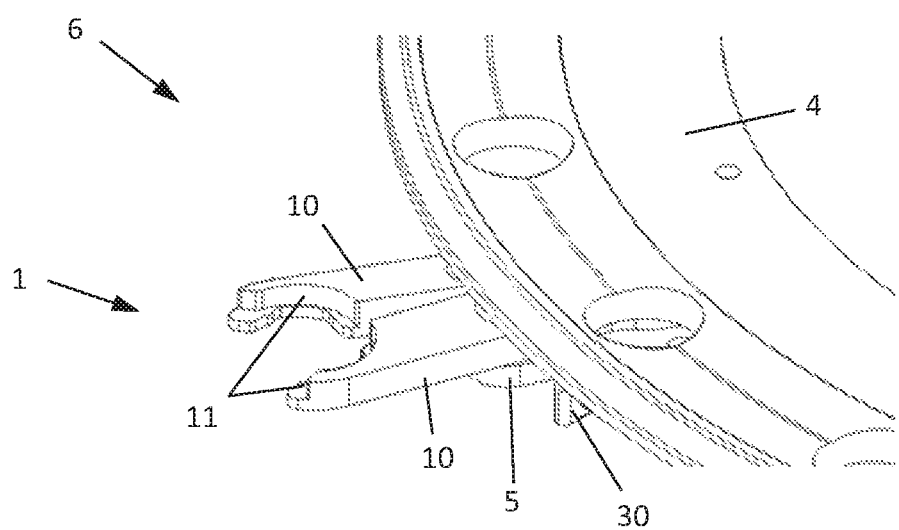
FIG. 5 is a schematic perspective side view from above of the portion of the container treatment device from FIG. 4.

FIG. 4 shows schematically a perspective side view from below of a portion of a container treatment device 6 with an active clamping device 1 according to FIG. 1. The container treatment device 6 can be for example a rinser carousel, a filler carousel, a capper carousel or a transport carousel.

The container treatment device 6 has a clamp carrier 4, which is rotatable about an axis which is not shown here. On the underside 40 of the clamp carrier 4 are disposed a plurality of active clamping devices 1 according to FIGS. 1 to 3, wherein in this case by way of example one of the active clamping devices 1 is shown. The active clamping device 1 is disposed between the underside 40 and a counter-plate 5 which is fixedly attached to the clamp carrier 4 with fixing elements which are not shown here. In order to dispose the clamping arms 10 on the clamp carrier 4 such that they can be pivoted, they are attached by means of bolts (not shown here) which are passed through the holes 120 of the clamping arms 10, corresponding mounting holes on the clamp carrier 4, and corresponding mounting holes 52 on the counter-plate 5, and are thereby pivotably mounted about the pivot axes 12.

Below the counter-plate 5, the control cam 3 has a lever element 30, which can be rotated by 90° by interaction with an actuator (not shown here) of the container treatment device 6, so that the control cam 3 can be displaced between the position shown in FIG. 3 and a position rotated through 90° from this. Alternatively, the control cam 3 can be contoured such that an angle of rotation other than 90°, for example 30°, 45°, 50° or 66°, is enabled for the displacement of the clamping arms 10 into the closed position of the holding sections 11 by means of the interaction between the control sections 13 and the control cam 3.

FIG. 5 again shows the portion of the container treatment device 6 that was shown in FIG. 4, in a schematic perspective side view from above. It can clearly be seen that the only portion of the clamping arms 10 which protrudes outwards from the clamp carrier 4 is that portion which extends in the direction of the holding sections 11, as viewed from the pivot axes 12. The control sections 13 and the pre-tensioning element 14, along with the control cam 3 with its lever element 30, are disposed beneath the clamp carrier 4. By this means, the control sections 13 and the pre-tensioning element 14, along with the control cam 3 with its lever element 30, are protected from contamination, while no parts that would interfere with the reception and holding of the containers protrude into the area below the holding sections 11.

Figure 6:
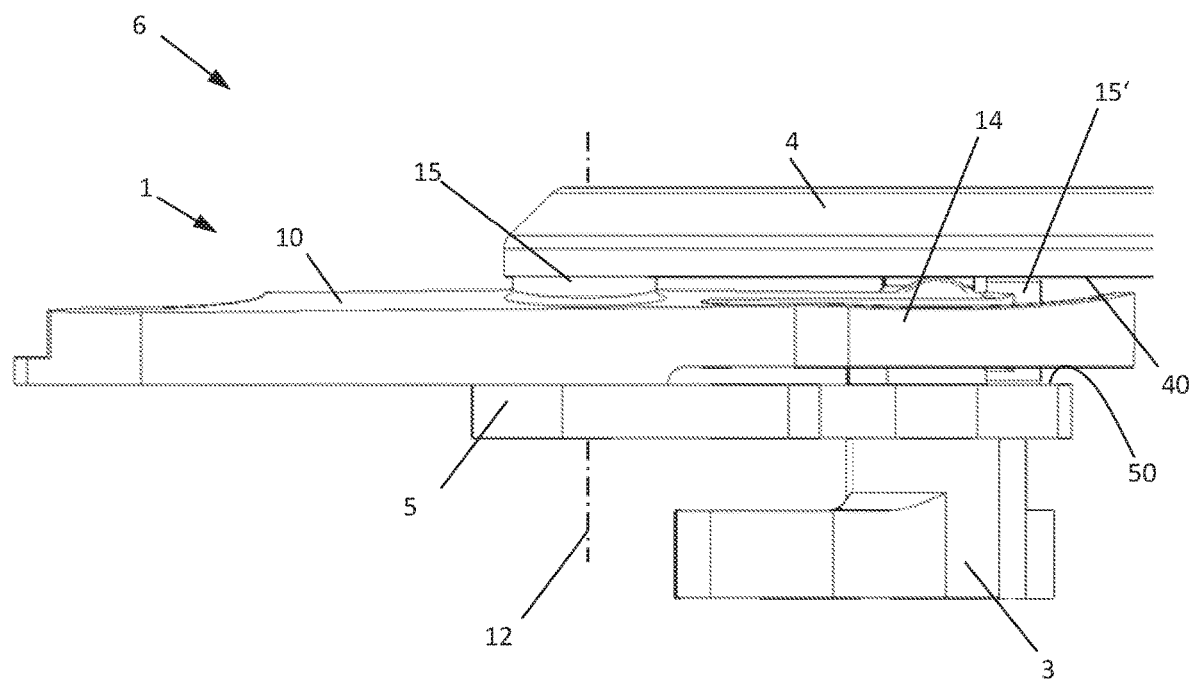
FIG. 6 is a schematic side view of the portion of the container treatment device from FIG. 4.

FIG. 6 shows schematically a side view of the portion of the container treatment device 6 from FIG. 4. It can be seen that the clamping arms 10 with their support elements 15 around the pivot axes 12 are braced against the underside 40 of the clamp carrier 4 and against an upper side 50 of the counter-plate 5. The clamping arms 10 are further braced, again against the underside 40 and the upper side 50, by means of the support elements 15' which are spaced apart from the pivot axes 12 in a rear area of the active clamping device 1. This reduces the free play in the mounting of the clamping arms 10, which is formed by bolts and holes 120. In particular, by means of the support provided by the support elements 15', it is possible to avoid tilting of the clamping arms 10 relative to the pivot axes 12.

Figure 7:
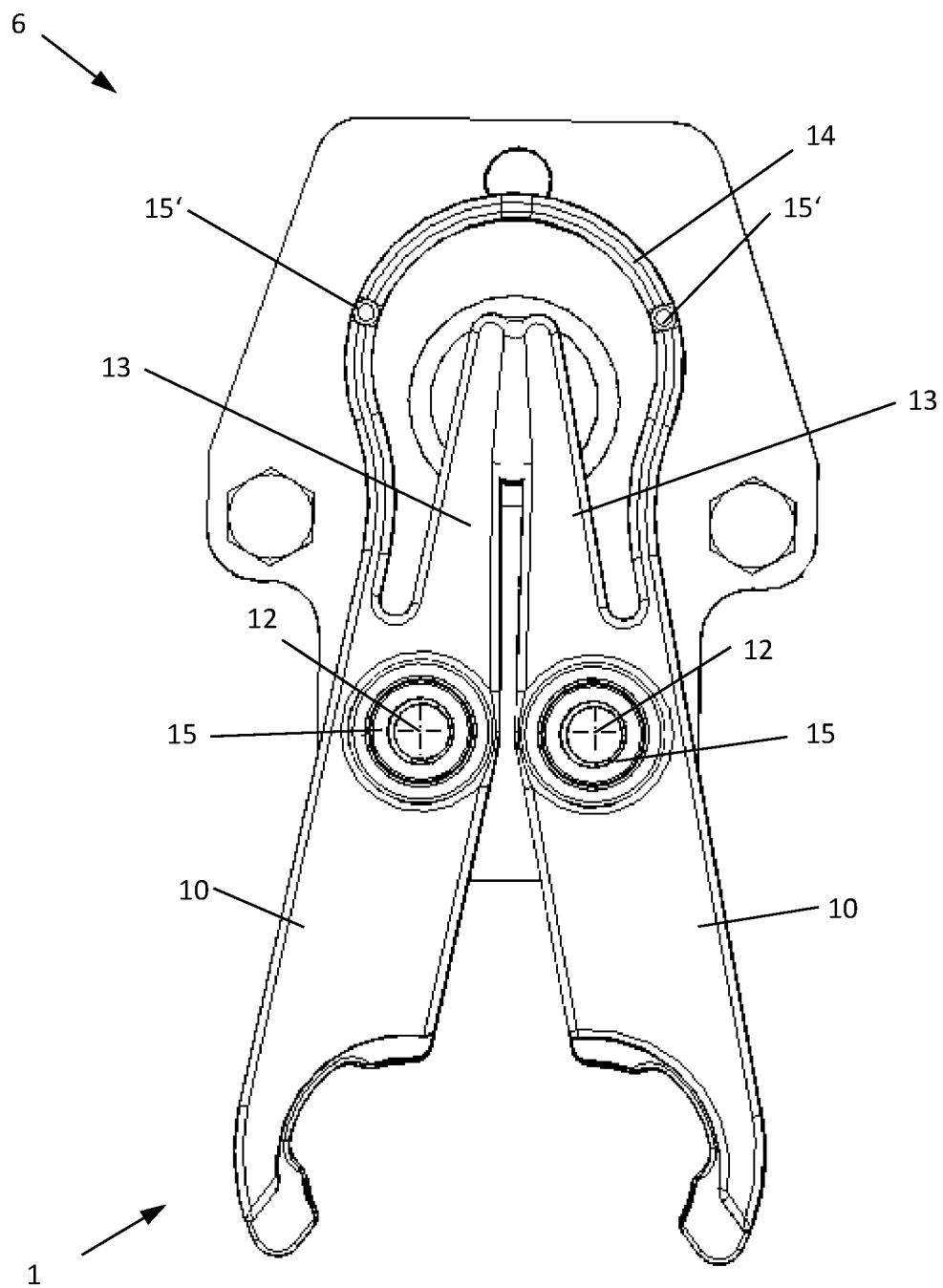
FIG. 7 is a schematic plan view of a container treatment device with an active clamping device according to a further embodiment.

FIG. 7 shows schematically a plan view of a container treatment device 6 with an active clamping device 1 according to a further embodiment, which substantially corresponds to that shown in FIG. 1. In this embodiment, the support elements 15' which are spaced apart from the pivot axes 12 are, however, disposed on the pre-tensioning element 14 on each side of the central longitudinal axis 20. This makes it possible to avoid disruptive interaction, for example disruptive slippage of a ring insert of the cam.

Figure 8:
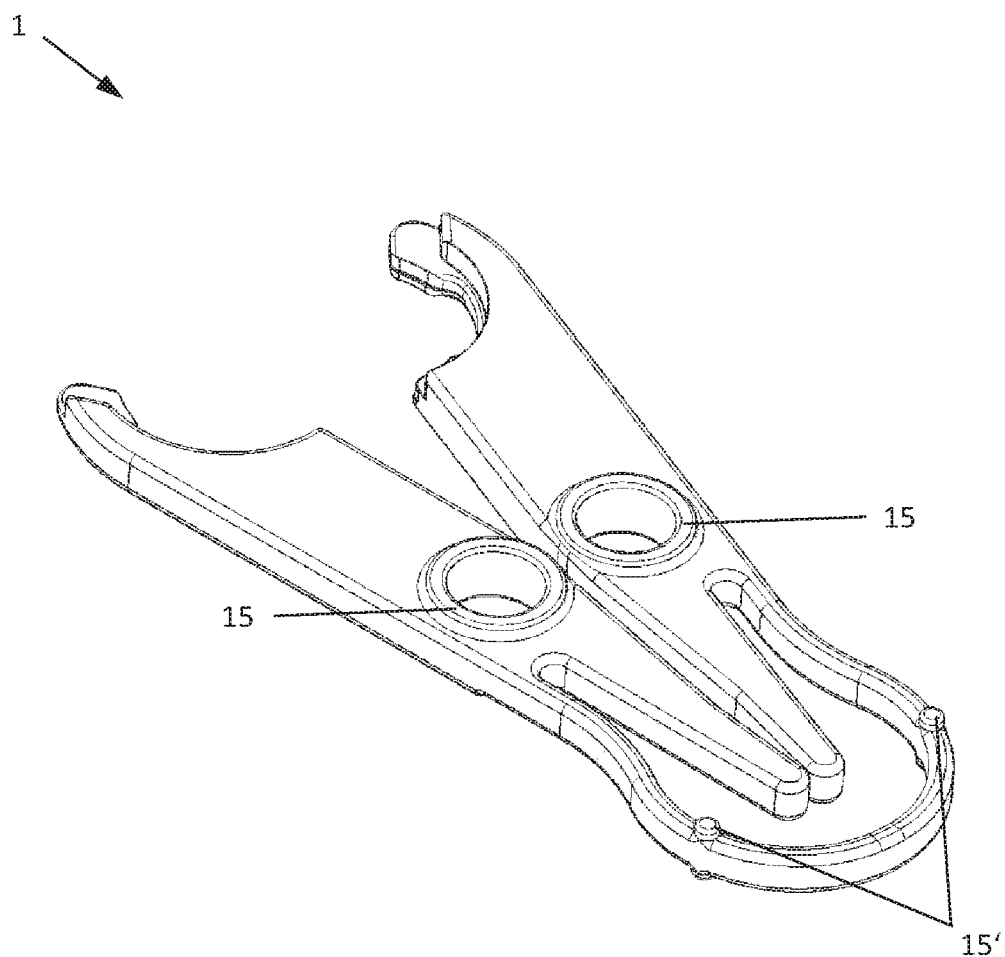
FIG. 8 is a schematic perspective side view of the active clamping device from FIG. 7.

FIG. 8 shows a schematic perspective side view of the active clamping device 1 from FIG. 7. The raised areas, which are designed as a single piece and form the support elements 15 and 15', can clearly be seen.

Figure 9:
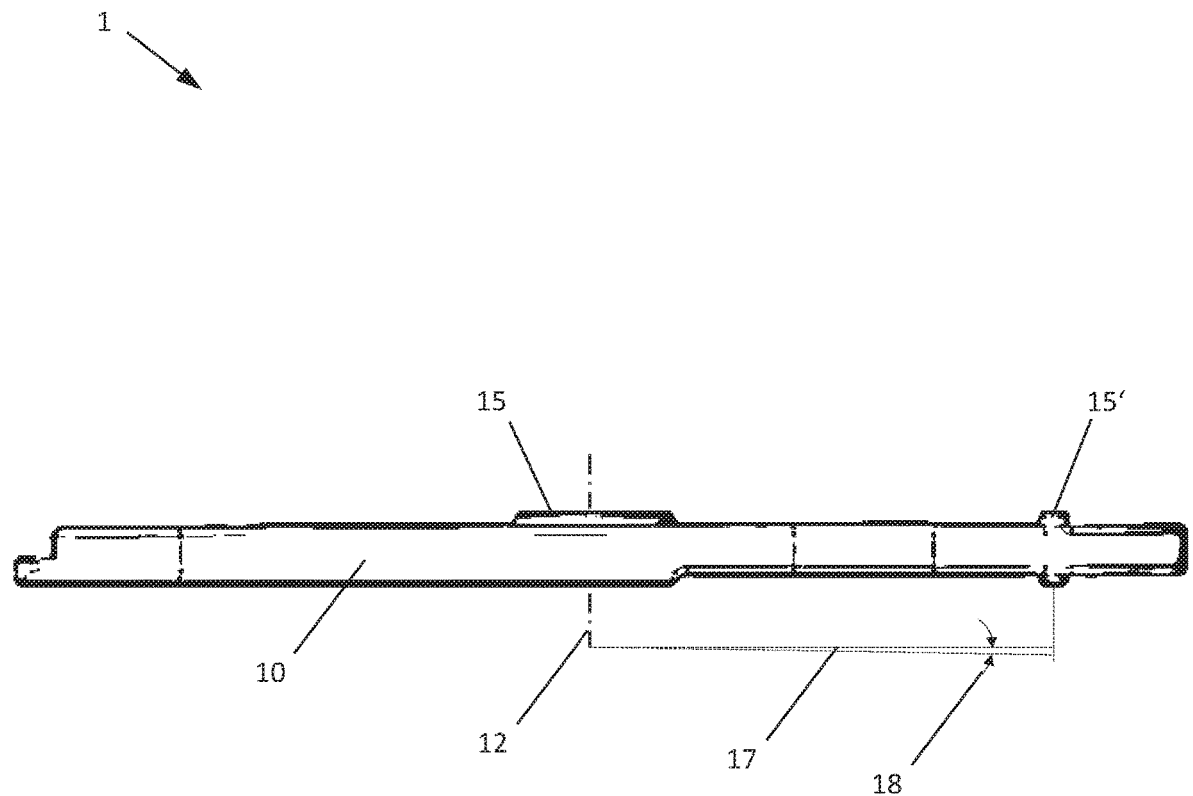
FIG. 9 is a schematic side view of the active clamping device from FIG. 8.

FIG. 9 shows schematically a side view of the clamping device 1 from FIG. 8. Due to the spacing 17 between the support elements 15 in the area of the pivot axis 12 and the support elements 15', which are spaced apart from these, displacement of a support element 15' parallel to the pivot axis 12 causes only minor tilting, equivalent to the tilting angle indicated by the reference sign 18. In the embodiment shown in FIG. 6, the support elements 15' can thus be disposed with free play between corresponding support areas or support surfaces of the container treatment device 6. The slight free play in the direction of the pivot axis 12 between the support elements 15' and the support areas or support surfaces due to the spacing 17 determines, or allows, only a tilting angle 18 which is sufficiently small to prevent almost entirely, in a simple manner, the tilting of the clamping arms 10. Thus despite the simple design of the clamping arms 10 and the clamping device 1, it is possible to provide an almost tilt-free mounting.

Figure 10:
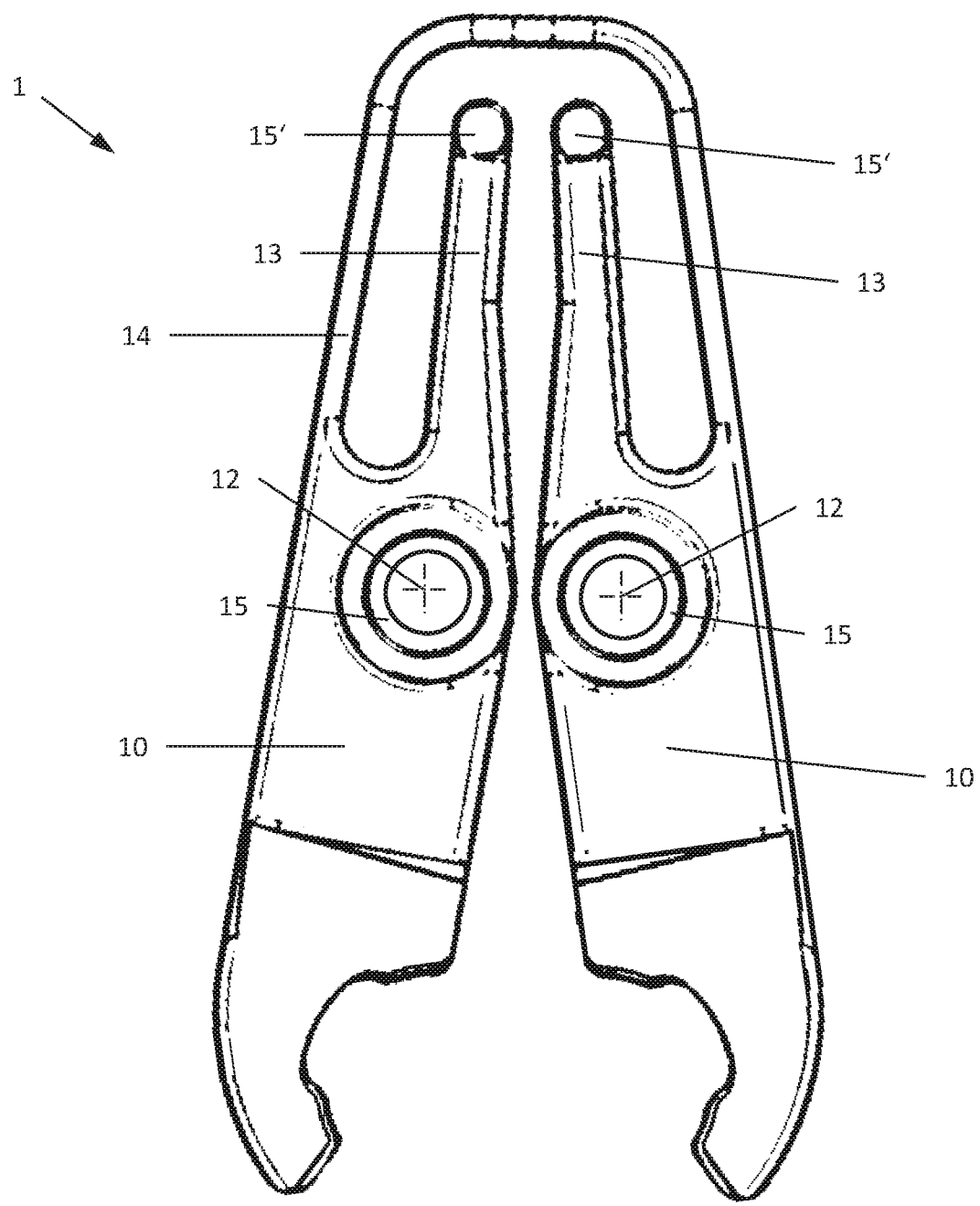
FIG. 10 is a schematically represented active clamping device according to a further embodiment.
Figure 11:
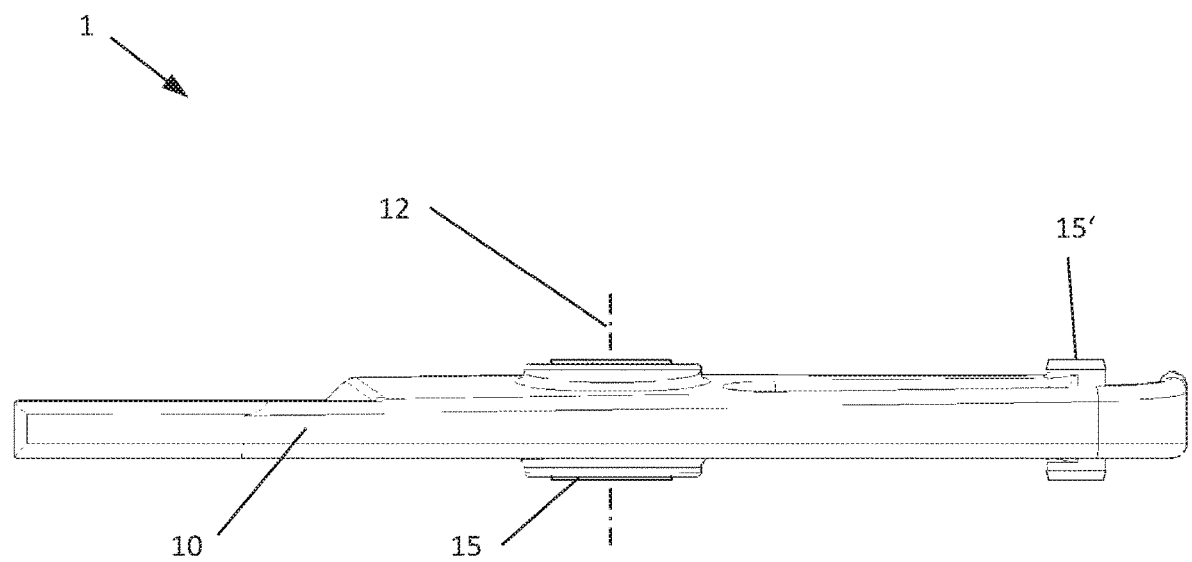
FIG. 11 is a schematic side view of the active clamping device from FIG. 10.

FIGS. 10 and 11 show schematically an active clamping device 1 according to a further embodiment. The design of this embodiment substantially corresponds to that shown in FIG. 1, except that the bowed shape of the pre-tensioning element 14 has straight sections. In addition, the support elements 15 and 15' are provided as separate parts formed from a metal. The support elements 15 in the area of the pivot axes 12 are in this case in the form of bearing bushes, and are pushed into the holes or receptacles that are provided for this purpose in the clamping arms 10. The external diameter of the support elements 15 is chosen such that the clamping arms 10 are pivotable about the bearing bushes. Thus the bearing bushes can be fixedly attached on installation in a container treatment device 6.

The support elements 15' which are spaced apart from the pivot axes 12, and are in this case also metal, are in this case overmolded at the end of the control sections 13 with the material of the control sections 13. In other words, the support elements are designed as inserts. The end faces of the support elements 15' are free of the material of the control sections 13 and have an abrasion-resistant sliding surface.

Alternatively, the clamping arms 10 and the pre-tensioning element 14 in the above-mentioned embodiments can also be provided as individual parts.

To the extent applicable, all individual features described in the example embodiments can be combined with each other and/or exchanged, without departing from the field of the invention.

What is claimed is:

1. An active clamping device for holding a container in a container treatment device, comprising:
    two clamping arms, wherein each clamping arm comprises a holding section configured to hold the container, and each clamping arm comprises a control section configured to interact with a control cam to actively displace each holding section; and
    a pre-tensioning element configured to pre-tension the holding sections in a predetermined position,
    wherein:
    the clamping arms and the pre-tensioning element are formed as a single piece,
    each clamping arm comprises support elements that are configured to support a position of the clamping arms against tilting with respect to pivot axes of the clamping arms,
    a first support element is formed in a region of a pivot axis of each clamping arm, and
    a second support element is formed at an end of the control section of each clamping arm.

2. The active clamping device of claim 1, wherein the pre-tensioning element pre-tensions the clamping arms in an open position of the holding sections, and the control sections are configured to interact with the control cam to actively displace the holding sections to a closed position.

3. The active clamping device of claim 1, wherein the pre-tensioning element pre-tensions the clamping arms in a closed position of the holding sections, and the control sections are configured to interact with the control cam to actively displace the holding sections to an open position.

4. The active clamping device of claim 1, wherein at least one of the clamping arms is configured to pivot about the pivot axis of the at least one of the clamping arms.

5. The active clamping device of claim 1, wherein the control sections are formed on the clamping arms in the form of a lever arm.

6. The active clamping device of claim 1, wherein the pre-tensioning element comprises a bowed element extending from one clamping arm to the other clamping arm.

7. The active clamping device of claim 1, wherein the control sections and the pre-tensioning element are disposed on a side of the clamping arms which is opposite to the holding sections.

8. The active clamping device of claim 7, wherein the holding sections are disposed on one side of the clamping arms, relative to the pivot axes, and the control sections and/or the pre-tensioning element are disposed on the other side.

9. The active clamping device of claim 1, wherein at least the clamping arms comprise, on their upper side, inclined surfaces configured to conduct away fluids.

10. The active clamping device of claim 1, wherein the control sections are elastic, and an elastic element is formed on each lever arm that forms the control section.

11. The active clamping device of claim 1, wherein the clamping arms and the pre-tensioning element are formed as a single piece as a 3D printed part or an injection molded part.

12. The active clamping device of claim 11, wherein the 3D printed part or the injection molded part comprises a plastic.

13. The active clamping device of claim 1, wherein the second support element is formed at a free end of the control section and the control section is formed as a lever arm.

14. The active clamping device of claim 1, wherein the first support element comprises a different material than its respective clamping arm.

15. A clamping arm for holding a container in a clamping device, comprising:
    a holding section configured to hold the container;
    a control section configured to interact with a control cam to actively displace the holding section; and
    at least two support elements, spaced apart from each other, and configured to support a position of the clamping arm against tilting with respect to a pivot axis of the clamping arm with respect to an installation position in the clamping device, wherein one support element is formed in a region of the pivot axis and one support element is formed at an end of the control section.

16. The clamping arm of claim 15, wherein the control section is elastic, an elastic element is formed on a lever arm that forms the control section, and the lever arm is elastically deformable at least within a defined area.

17. The clamping arm of claim 15, wherein the clamping arm and at least one support element are formed as a single piece.

18. The clamping arm of claim 15, wherein at least one support element comprises a different material than the clamping arm.

19. The clamping arm of claim 15, wherein an upper side of the clamping arm comprises at least one inclined surface configured to conduct away fluids.

20. The clamping arm of claim 15, wherein the one support element formed at an end of the control section is formed at a free end of the control section and the control section is formed as a lever arm.

* * * * *